United States Patent Office
3,159,422
Patented Dec. 1, 1964

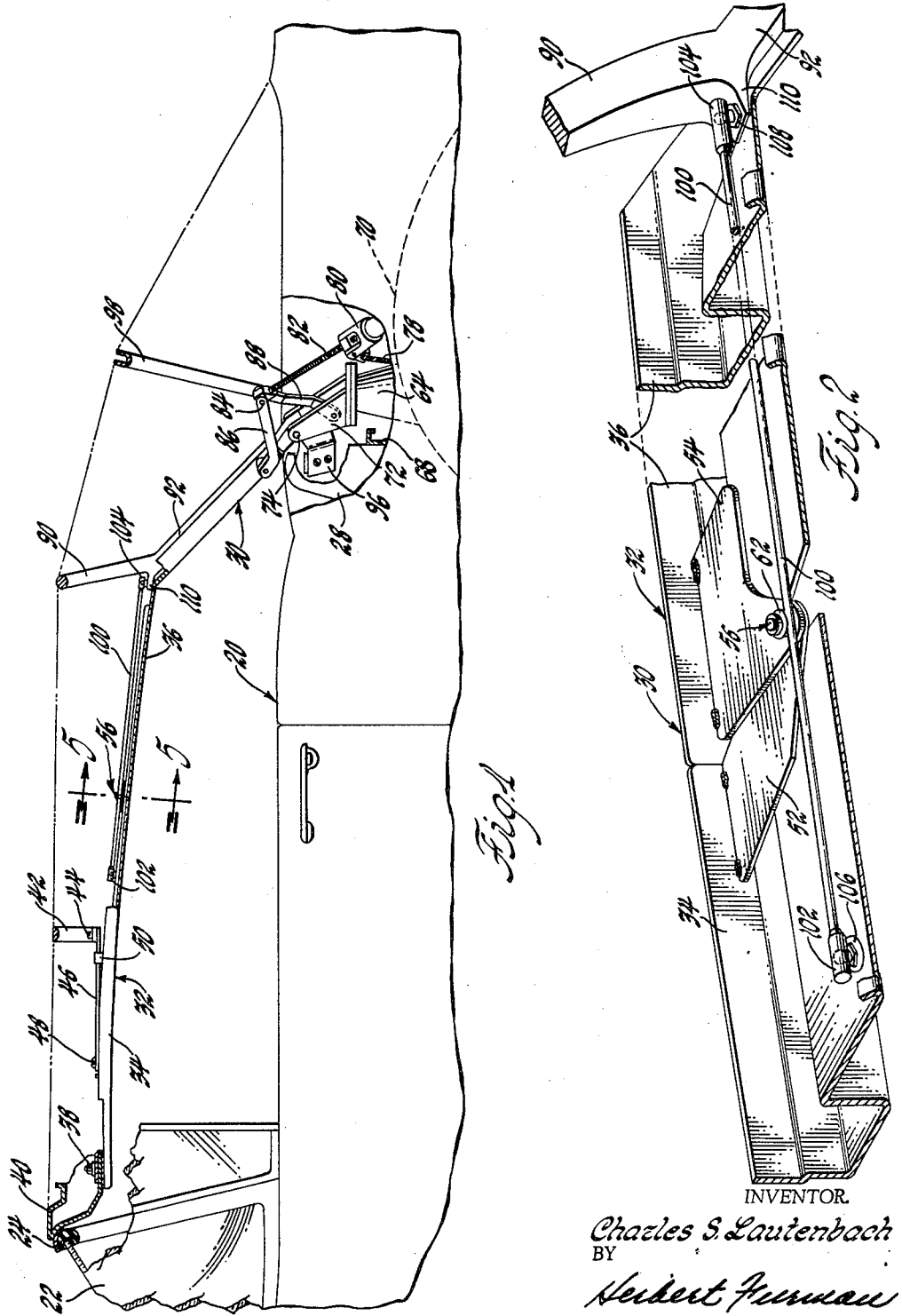

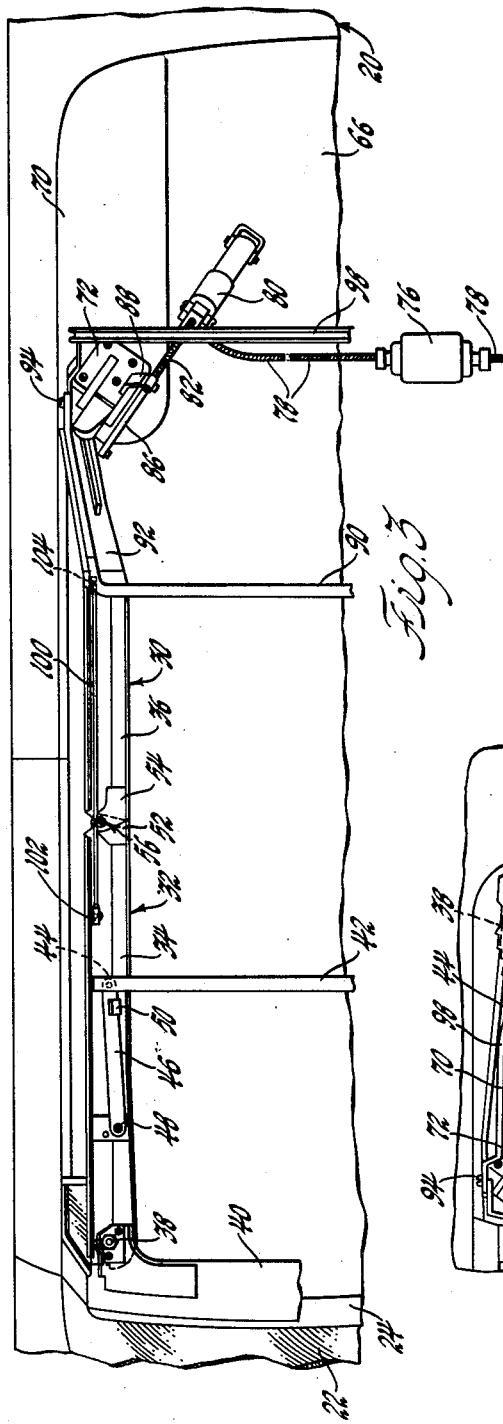

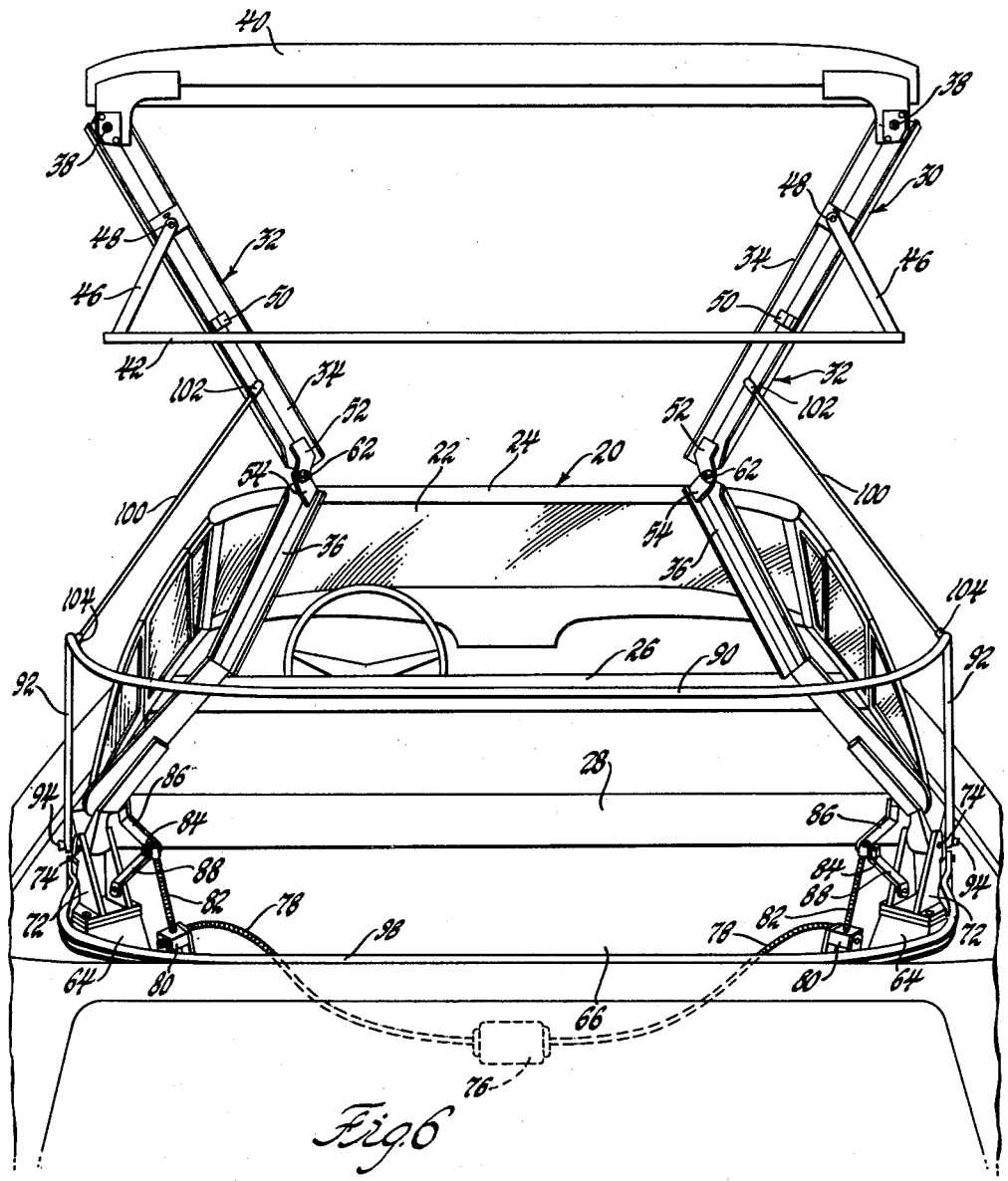

1

3,159,422
CONVERTIBLE TOP
Charles S. Lautenbach, Rochester, Mich., assignor to General Motors Corporation, Detroit, Mich., a corporation of Delaware
Filed Aug. 13, 1962, Ser. No. 216,399
7 Claims. (Cl. 296—117)

This invention relates to convertible tops and more particularly to convertible tops of the inwardly folding side rail type.

One feature of this invention is that it provides an improved inwardly folding side rail convertible top. Another feature of this invention is that it provides a new and improved stabilizing means for controlling swinging movement of pivotally interconnected rail sections with respect to each other. A further feature of this invention is that it provides a new and improved stabilizing means for controlling folding movement of a pair of inwardly folding convertible top rails. Yet another feature of this invention is that it provides a new and improved stabilizing means for controlling folding movement of a pair of inwardly folding convertible top side rail sections, with the stabilizing means including a stabilizing member and means including universal joint means for coupling the stabilizing member between the body and one of the rail sections. Yet a further feature of this invention is that it provides an improved inwardly folding side rail convertible top which includes a pair of inwardly folding side rails, each of which includes a front rail section, a rear rail section pivotally connected to the front rail section and swingably mounted on the body for movement inwardly and rearwardly thereof, and a stabilizing member which is coupled between each of the front rail sections and the body for controlling folding movement of each front rail section with respect to its respective rear rail section to thereby ensure synchronous folding movement of both rails with respect to each other.

These and other features and advantages of the invention will be readily apparent from the following specification and drawings wherein:

FIGURE 1 is a partially broken away partial side elevational view of a convertible type vehicle body having a convertible top mounted thereon embodying a stabilizing means according to this invention;

FIGURE 2 is an enlarged partially broken away perspective view of a portion of FIGURE 1;

FIGURE 3 is a partial top plan view of FIGURE 1;

FIGURE 4 is a partial view showing the top in lowered position;

FIGURE 5 is an enlarged sectional view taken generally along the plane indicated by line 5—5 of FIGURE 1, and FIGURE 6 is a rear perspective view showing the top in a partially lowered position.

Referring now particularly to FIGURES 1, 3, 4 and 6 of the drawings, a convertible vehicle body 20 includes a windshield 22 and a windshield header 24. The passenger compartment of the body includes a vehicle front seat 26 and a vehicle rear seat 28. A convertible top 30 of the inward folding rail type is mounted on the body 20 for movement between a raised position, as shown in FIGURES 1 and 3, and a lowered position, as shown in FIGURE 4, in order to open and close the passenger compartment of the body. Top 30 is more specifically shown and described in copending application S.N. 30,960, Gilson et al., filed May 23, 1960, and assigned to the assignee of this invention. Accordingly, only a brief description will be given herein.

The top 30 generally includes a spaced pair of inwardly folding side rails 32, each of which includes a front rail section 34 and a rear rail section 36, with the rear rail section being supported on the body. Since the rails 32 are of like construction, although of different hand, only one such rail will be described, and it will be understood that the other is of the same construction.

The front rail sections 34 are each pivotally connected at 38 to one end of a convertible top header 40 which spans the body and is adapted to bear against the windshield header 24 in the raised position of the top as shown in FIGURES 1 and 3.

A front or No. 1 bow 42 of rigid construction has its ends pivoted at 44 to the rearward ends of links 46. The forward ends of links 46 are pivoted at 48 to the front rail sections 34. In order to locate links 46 and bow 42 laterally of rails 32 in the raised position of the top, brackets 50 are welded to the rail sections 34, with each bracket being provided with a pocket receiving a respective link 46 in the raised position of the top. When the front rail sections 34 swing inwardly about the pivots 38 as the top is being lowered, the links 46 swing outwardly of the rail sections 34 about their pivots 48 to allow the bow 42 to move with the top and to be folded relative to the rail sections 34.

Rail sections 34 and 36 are provided with respective brackets 52 and 54 which overlap in all positions of the rail sections. As shown in FIGURE 5, a headed stud or pivot 56 has the head thereof freely received within an opening in rail section 36, an intermediate flange or shoulder 58 thereof journalled within an opening in bracket 52 and bearing against bracket 54, and the shank 60 thereof journalled within an opening in bracket 54 and extending upwardly therefrom. A grooved roller or pulley member 62 is journalled on the shank 60 and the end of the shank is headed over to retain the stud 56 and roller 62 in place and pivotally interconnect the rail sections 34 and 36.

Referring now particularly to FIGURES 1, 3, 4 and 6 of the drawings, the manner in which the rear rail sections 36 are mounted on the body will be described. A mounting support 64 is mounted within the top well 66 of the body rearwardly of the rear seat 28 and immediately rearwardly of a body partition 68. Preferably, the support 64 is welded or otherwise rigidly secured to the inner rear wheelhousing 70 of the body. Support 64 is bolted to a trunnion bracket 72 which includes a spaced pair of upstanding ears pivotally secured at 74 to the rear rail sections 36. The axes defined by the pivots 74 lie in a horizontal plane, with each axis extending generally forwardly and inwardly of the body in this horizontal plane whereby the axes converge with respect to each other. Each axis lies in a vertical plane located approximately 45° with respect to the vertical plane of the center line of the body.

The rear rail sections 36 are power operated in order to move the top between raised and lowered positions. As shown in FIGURES 3, 4 and 6, an electric motor 76 mounted on the body rearwardly of the partition 68 drives a pair of flexible cables 78. Each cable drives a gear drive unit 80 which is swingably supported on the body. The gear drive unit is of known type and reference may be had to Patent No. 2,905,012 Lohr et al. for the details of a suitable unit. A screw shaft 82 is threadedly received through each of the drive units, with the upper end of the screw shaft being pivoted at 84 to one end of offset links 86 and 88, link 86 being pivoted at its other end to the rail section 36 and link 88 being pivoted at its other end to the inboard ear of bracket 72. Upon operation of the motor 76, the drive unit 80 will rotate to thread the shaft 82 inwardly and outwardly thereof to thereby fold and unfold links 86 and 88 and swing the rail sections 36 about the pivots 74.

The intermediate or No. 2 bow 90 is of one-piece construction and is integral with or fixed to bow supports 92 which rest on rail sections 36 in the raised position of the top. The bow supports 92 are pivoted at 94 to a bracket 96 secured to the body, with supports 92 swinging in parallel longitudinal vertical planes with respect to the body. The rear or No. 3 bow 98 has its ends pivoted to the bracket 96 for likewise swinging movement in parallel longitudinal vertical planes with respect to the body.

Referring now particularly to FIGURES 1, 2 and 6 of the drawings, the stabilizing means will be described. The stabilizing means generally comprises a rigid rod or other member 100 having fixedly secured to the ends socket members 102 and 104 of like construction. A ball member 106 is secured to the front rail section 34 forwardly of the pivot stud 56 and the socket 102 receives the member 106 therein to provide a universal joint connection between the forward end of the member 100 and the front rail section 34. A ball member 108, of like construction as the ball member 106, is mounted on a laterally extending lip or flange 110 at the juncture of the bow 90 and the bow supports 92, with the ball member 108 being received within the socket 104 to provide a universal joint connection connecting the other end of the member 100 and the bow 90 and bow supports 92. When the top is in a raised position, as shown in FIGURES 1 and 2, the member 100 fits against the roller 62, being received within the groove of the roller. It will be noted that the stabilizing member 100 is located adjacent the outboard edge portion of the side rail 32 and is also located outboard of the stud 56.

The movement of the convertible top between a raised position, as shown in FIGURES 1 and 3, to a lowered position, as shown in FIGURE 4, will now be described. However, the operation of the stabilizing means will be described hereinafter in detail.

Upon operation of the motor 76 in a suitable direction so as to operate each of the drive units 80 to in turn shift the screw shafts 82 downwardly of the body, the links 86 and 88 will be folded with respect to each other to swing the rear rail sections 36 rearwardly and downwardly of the body about the pivots 74. As the rail sections 36 swing rearwardly and downwardly of the body, the rail sections 34 will swing generally outwardly with respect to the rail sections 36 about pivots 56 so as to fold each of the rails 32. The links 46 will generally swing outwardly of the rail sections 34 about their pivots 48 as can be seen in FIGURE 6, so as to allow the rail sections 34 to swing inwardly with respect to the front or No. 1 bow 42. Likewise, as the rail sections 36 swing rearwardly and downwardly of the body, the bow supports 92 and bow 90 will swing generally rearwardly and downwardly of the body as the rail sections 36 swing inwardly of the body from underneath the bow supports, as can be seen in FIGURE 6. Thereafter, upon continued folding movement of the top, the top will move to a folded position, as shown in FIGURE 4, within the top well 66. Generally, the rail sections 34 and 36 will be stored above the bows 90 and 98, and the bow 42 will be stored below rail sections 34 and forwardly of the bows 90 and 98.

As the rails 32 fold inboard of the body, it can be seen that the rail sections 34 of each rail can freely swing relative to their respective rear rail sections 36, the only limit to this free swinging movement being the top header 40. It is desirable that the included angles between the front rail sections and their respective rear rail sections be equal at all times so that the header 40 will move rearwardly and downwardly without swinging laterally of the body or moving erratically as the top is being lowered. The stabilizing members 100 ensure that the included angle between the rail sections of each rail remain equal. Both of the members 100 are of predetermined equal length. If the right-hand front rail section 34, for example, starts to swing clockwise about its respective pivot 56 so that the included angle tends to decrease as the top is being lowered, this swinging movement will be resisted by the left-hand stabilizing member 100 since the left-hand stabilizing member will resist swinging movement of the left-hand front rail section 34 in the same direction about its respective pivot 56. Thus, the stabilizing members complement each other in their action, although it should also be noted that the stabilizing members will also resist swinging movement of their respective front rail sections as soon as this swinging movement exceeds a predetermined amount since the stabilizing members are of a predetermined length, and of course, must swing in a predetermined arc about their universal joint connections with the bow 90 and the bow supports 92.

Thus, the stabilizer members control the folding movement off the front rail sections 34 relative to the rear rail sections and to the body at all times so that the included angles between the rail sections of each rail remain substantially equal and the top folds in a uniform manner, with the top header 40 remaining substantially parallel to the windshield header 24 during this movement.

Thus, this invention provides a new and improved convertible top.

What is claimed is:

1. In combination with a vehicle body, a convertible top including front and rear rail sections pivotally interconnected for folding movement inboard of said body, means pivotally mounting said rear rail section on said body, and stabilizing means coupled between said front rail section and said body and controlling folding movement of said front rail section relative to said rear rail section and to said body, said stabilizing means including first means movably mounted on said body, second means movably mounted on said front rail section, said first and second means being movable in planes dissimilar with respect to each other, and means interconnecting said first and second means and permitting said first and second means to move in said dissimilar planes.

2. In combination with a vehicle body, a convertible top including front and rear rail sections pivotally interconnected for folding movement thereof inboard of said body, means pivotally mounting said rear rail section on said body, a stabilizing member of a predetermined length, means pivotally connecting said member adjacent one end thereof to said front rail section, and means pivotally connecting said stabilizer member adjacent the other end thereof to said body, said stabilizer member and said pivotal connecting means being movable in planes dissimilar with respect to each other upon folding movement of said rail sections and said stabilizer member controlling folding movement of said front rail section relative to said rear rail section and to said body.

3. In combination with a vehicle body, a convertible top including a plurality of pivotally interconnected rail sections mounted on said body for folding movement inboard thereof, first means mounted on said body for swinging movement in a plane longitudinally thereof upon folding movement of said rail sections, and second means coupled between said first means and one of said rail sections to control folding movement of said one rail section relative to said other rail section and to said body.

4. In combination with a vehicle body, a convertible top mounted on said body and including front and rear pivotally interconnected rail sections foldable inboard of said body, means mounting said rear rail section on said body for swinging movement about an axis extending forwardly and inboard of said body, means mounted on said body and swingable in a plane longitudinally of said body upon folding movement of said rail sections inboard of said body, and stabilizing means coupled between said swingable means and one of said rail sections to control folding movement of said one rail section relative to said other rail section and to said body.

5. In combination with a vehicle body, a convertible top including front and rear rail sections, means pivotally interconnecting said rail sections for folding movement inboard of said body, means mounting said rear rail section on said body for swinging movement inwardly and rearwardly thereof, a top bow mounted on said body for swinging movement in a plane longitudinally of said body upon folding movement of said rail sections, and a stabilizer member coupled between said top bow and said front rail section for controlling folding movement of said front rail section relative to said rear rail section and to said body.

6. In combination with a vehicle body, a convertible top including front and rear rail sections, means pivotally interconnecting said rail sections for folding movement inboard of said body, means mounting said rear rail section on said body for swinging movement inwardly and rearwardly thereof, a top bow mounted on said body for swinging movement in a plane longitudinally of said body upon folding movement of said rail sections, and a stabilizer member coupled between said top bow and said front rail section for controlling folding movement of said front rail section relative to said rear rail section and to said body, said stabilizer member engaging said pivot means in the raised position of said top.

7. In combination with a vehicle body, a convertible top including front and rear rail sections, means pivotally interconnecting said rail sections for folding movement inboard of said body, means mounting said rear rail section on said body for swinging movement inwardly and rearwardly thereof, a top bow mounted on said body for swinging movement in a plane longitudinally of said body upon folding movement of said rail sections, said top bow including bow supports engaging said rear rail section in the raised position of said top, and a stabilizer member coupled between said bow supports and said front rail section for controlling folding movement of said front rail section relative to said rear rail section and to said body.

References Cited in the file of this patent
UNITED STATES PATENTS

| | | |
|---|---|---|
| 1,533,148 | Tomkins et al. | Apr. 14, 1925 |
| 2,578,990 | Bessonneau | Dec. 18, 1951 |
| 2,768,857 | Albrecht | Oct. 30, 1956 |

FOREIGN PATENTS

| | | |
|---|---|---|
| 943,747 | Germany | June 1, 1956 |